Dec. 12, 1972 M. M. HINTZE ET AL 3,706,044

ANALOG MAJORITY VOTING CIRCUIT

Filed Sept. 29, 1970 2 Sheets-Sheet 1

INVENTORS
MELVIN M. HINTZE
JOHN P. MARI
ROY F. McDANIEL
EDDIE A. EVEL

BY

Dec. 12, 1972 M. M. HINTZE ET AL 3,706,044
ANALOG MAJORITY VOTING CIRCUIT
Filed Sept. 29, 1970 2 Sheets-Sheet 2

INVENTORS
MELVIN M. HINTZE
JOHN P. MARI
ROY F. McDANIEL
EDDIE A. EVEL
BY
James B. Eisel

United States Patent Office 3,706,044

Patented Dec. 12, 1972

3,706,044

ANALOG MAJORITY VOTING CIRCUIT

Melvin M. Hintze and John P. Mari, Littleton, Colo., Roy F. McDaniel, Los Gatos, Calif., and Eddie A. Evel, Colorado Springs, Colo., assignors to Martin Marietta Corporation, New York, N.Y.

Filed Sept. 29, 1970, Ser. No. 76,396

Int. Cl. G06f *11/08;* H03k *5/08*

U.S. Cl. 328—137 1 Claim

ABSTRACT OF THE DISCLOSURE

This is a circuit for providing to a load the middle valued analog signal of three redundant channels. Each channel is terminated in a high gain amplifier having high impedance constant current characteristics when saturated. The amplifier outputs are connected at a common point, and three negative feedback circuits connect the common point to the amplifier inputs.

One method of improving the reliability of electric and electronic circuits is the use of redundancy, i.e., two or more identical systems or channels that perform the same function so that if one fails the other remains operative and the desired end function is still performed. The use of a simple arrangement of two redundant channels may be adequate where an anticipated failure would result in one of the channels having no output, or where there is, for instance, a human operator who monitors performance and is able to switch in the operative channel and switch out the disabled channel. However, in automatic operating systems, where it is impossible or impractical to have a human operator, a failure in a simple two-channel redundant system that results in an erroneous output from one channel, rather than no output, creates an ambiguous situation in which two different operating signals exist. It is difficult to arrange for an automatic determination as to which output is correct.

To avoid this situation, three-channel redundancy has been frequently used. A failure in or erroneous output from one of the three identical channels still leaves two correct output signals, and thus, a basis exists for making a determination as to the correct signal: the two agreeing signals will be correct.

Systems for examining the outputs of triply-redundant channels and connectign the correct signals to the load or operating device have come to be known in the art as majority voting systems. In general, majority voting systems require both a means to monitor the three outputs and determine the "majority" signal, and some type of switching means to connect the correct signal to the load or output device. Considerable extra circuitry, in addition to the three redundant channels, is generally required to perform these functions. Such additional circuitry adds cost, requires an additional space, and is itself subject to component failure. Further, most existing majority voting systems are adapted for use only with digital signals.

It is an object of this invention to provide a majority voting system that requires few, if any, extra components, but that comprises a specific configuration of components that would normally be required in any case for the three redundant channels.

It is a further object of this invention to provide a majority voting system for use with analog signals and one particularly well adapted to drive a high current load or output device.

These objects are achieved broadly as follows in one embodiment of this invention. Three substantially identical high gain amplifiers receive at their inputs analog signals from the three channels. The amplifiers act as high impedance current sources when driven into saturation in either polarity. The outputs of the amplifiers are connected at a common point which is connected to the load. From the load, a separate feedback circuit is run to the input of each amplifier and is so designed that the closed loop gains of the amplifiers are all equal.

In operation, if the outputs of the three amplifiers differ from each other more than a minute amount, which will almost always be the case, the two extreme valued amplifiers, that is, the two having the highest and the lowest output values, will be driven to saturation in opposite directions and will roughly cancel each other out as far as effect on the load is concerned, while the third amplifier, having the intermediate valued output, will operate in a normal, unsaturated mode and drive the load. Thus, this redundant circuit drives the load with the intermediate value of the three output analog signals. By providing the amplifiers with current limiting in saturated operating modes, the circuit insures that the two saturated, or hardover, amplifiers will effectively offset each other, no matter what input signal one of them may receive due to a failure upstream in one of the three channels. By incorporating further safety features into the amplifiers, provision may be made for limiting the current output and providing for driving the load normally in the event of a failure in the amplifier itself. The circuitry of this majority voter is not additional circuitry since it makes use of a unique arrangement of amplifiers that would normally be used as the final stage of each channel.

The design and operation of the inventive circuitry will be more readily understood by reference to the following detailed description, taken in conunction with the drawings, which form a part of the specification, and in which.

Figure 1:
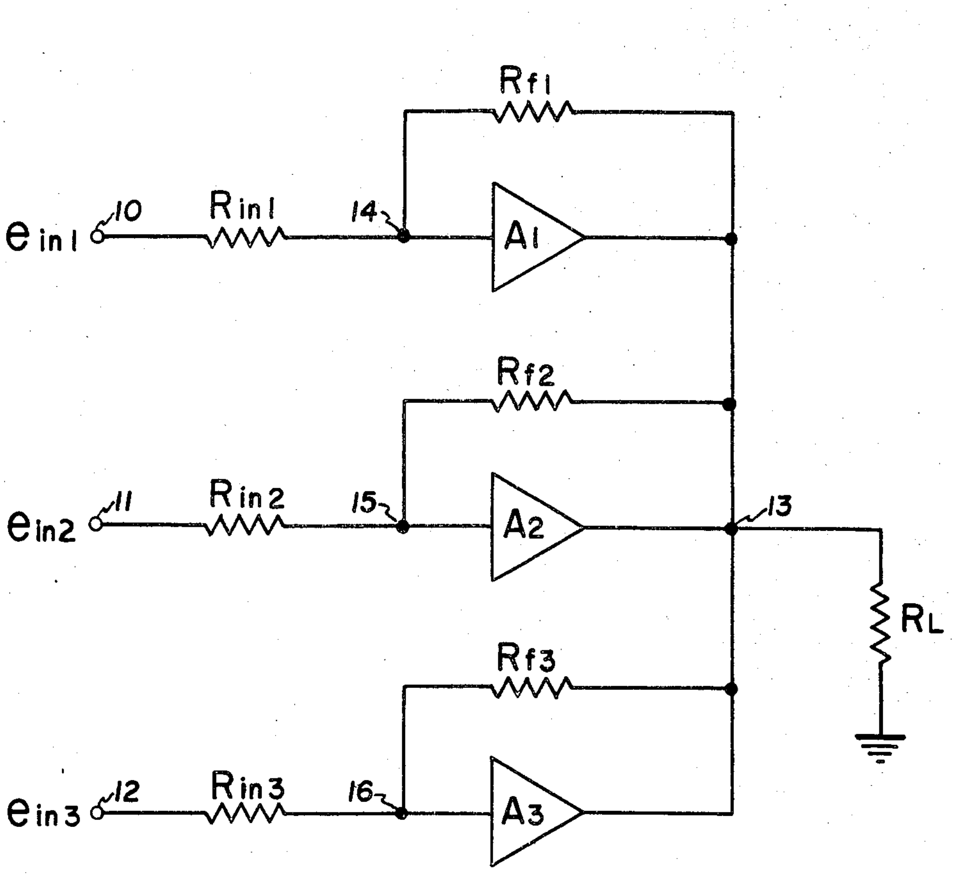
FIG. 1 is a block schematic diagram of the overall majority voting circuit.

Referring now to FIG. 1, the signals $e_{in1}$, $e_{in2}$ and $e_{in3}$, from three redundant channels (not shown) are fed into three corresponding channels of the majority voting circuit. Each majority voter channel is substantially identical, and its components are identified by numerical subscripts 1, 2 or 3 corresponding to the input signal it handles. Signals $e_{in1}$, $e_{in2}$ and $e_{in3}$ are fed respectively into input terminals 10, 11 and 12 and thence through series connected input resistors $R_{in1}$, $R_{in2}$ and $R_{in3}$ to the inputs of amplifiers $A_1$, $A_2$ and $A_3$. The outputs of the amplifiers are connected at a common point 113 which is in turn connected to a load schematically indicated as a load resistance $R_L$. From common connection point 13, three feedback resistors $F_{f1}$, $R_{f2}$ and $R_{f3}$ are connected to the inputs of amplifiers $A_1$, $A_2$ and $A_3$ respectively at summing junctions 14, 15 and 16.

The amplifiers used should have a high open loop gain, preferably on the order of five thousand or more. They should also be current limited when operating hardover (or saturated), in either polarity, with their limiting currents in the two polarities being somewhat different. Thus, when saturated in a positive polarity, the amplifier will act as a high impedance current source, and its output current will be different in value from its limited output when it is saturated in a negative polarity and acting as a high impedance current sink.

For amplifiers having an open loop gain greater than five thousand connected in a feedback loop as shown, the closed loop gain is:

$$\frac{e_{out}}{e_{in}} = -\frac{R_f}{R_{in}} \qquad (1)$$

where $e_{out}$ is the output voltage, appearing at connection point 13, and at load $R_L$. The values of $R_f$ and $R_{in}$ may be set to give any desired value of closed loop gain. The designed gain for each of the three channels should be the same, of course. The circuit will work with any designed closed loop gain, but high gain values may become less desirable for reasons having nothing to do with the operability of the majority voter circuit, since the accuracy of predictability of the gain value diminishes as it gets up around forty or fifty, and the suitability of high gain circuits therefore depends upon the accuracy required for their particular application.

For this configuration of feedback circuit, again with the open loop amplifier gain greater than five thousand, the voltage at the summing junctions 14, 15 and 16 is given by the following expression:

$$V_{sj}=e_{out}/-K \quad (2)$$

where K is the amplifier open loop gain. For reasonably small values of output voltage and the large open loop gain of the amplifiers used, it will be seen that the voltage at the summing junction will be very small, essentially a null. Further, and this is important in understanding the operation of the circuit, any small variation from the very low voltage that would normally appear at the summing junction would, because of the very high open loop gain of the amplifier, tend to drive it hardover into saturation in one polarity or another.

The operation of the circuit should be considered in light of the above exposition. There will be sufficient slight variations in the input signals or in the amplifier characteristics, or in both, so that the conditions for simultaneously unsaturated operation of all three majority voter channels cannot be satisfied with only the single output voltage possible at junction point 13. Therefore, effectively, the circuit may be looked at as trying to achieve three separate output voltages; and since only one is possible, the circuit channels trying to achieve the highest and the lowest of the three values will be driven hardover into saturation in opposite polarities. Another way of looking at it is that the voltage at point 13 will reflect back to two of the three summing junctions voltages that are out of line with the normal operating voltages, and that will therefore drive the high gain amplifiers into saturation. While rigorous mathematical analysis of the circuit operation would unduly lengthen this specification and is not deemed necessary, a heuristic example may be helpful. Suppose the closed loop gains are unity, so that $R_{in}=R_f$. Suppose further that there is variation in the redundant channels upstream so that $e_{in1}=1$ volt, $e_{in2}=3$ volts and $e_{in3}=5$ volts. Then the output at junction 13 will be $-3$ volts. Referring to the subscript 1 channel, since $R_{in1}=R_{f1}$, the difference of 4 volts between $e_{in1}$ and $e_{out}$ will be halved across the resistive divider comprising $R_{in1}$ and $R_{f1}$ and the voltage at summing junction 14 will be $-1$ volt. This will drive amplifier $A_1$ into saturation in the positive polarity. Conversely, the difference of eight volts between $e_{in3}$ and $e_{out}$ will be split across $R_{in3}$ and $R_{f3}$, making the voltage at summing junction 16 be $+1$ volt, sufficient to drive amplifier $A_3$ into saturation in the negative polarity. Thus, it will be seen that the two extreme valued amplifiers saturate in opposite polarities.

The above values of input voltage were chosen solely for ease of computation in the example, and are not intended to be representative of the spread of input voltages from three substantially identical upstream redundant channels. If such channels were operating normally, the three output voltages would probably be much closer. However, as may be seen by an examination of Equation 2, a very slight variation in voltage inputs, such as would normally occur, is enough to cause two of the amplifiers to saturate. Of course, in the case of a failure upstream, causing one of the three input signals to deviate widely from the other two, the circuit would continue to "vote" in the same manner, with the deviant signal not being transmitted to the load. Because of the manner in which the circuit operates, in addition to majority voting three almost identical inputs, it could also be used to supply to a load the middle valued of three differing input signals.

A requirement of the amplifiers used in this circuit, as stated above, is that in saturation they appear as high impedance, constant current sources or sinks, depending upon the direction or polarity of their saturation. The saturation currents for the three amplifiers are equal, but the source saturation currents and sink saturation currents are usually made unequal for reasons given below. In the amplifier shown in FIG. 2, the current output for saturation in the positive polarity, or source saturation current, is 16 ma. and the current output for saturation in the negative polarity, or sink saturation current, is 12 ma. With this amplifier used in the circuit, then it will be seen that 12 ma. of the 16 ma. of source current supplied by the positively saturated amplifier will be used in supplying the 12 ma. of sink current required by the negatively saturated amplifier, leaving only 4 ma. of source current to be absorbed by the third amplifier or the load. Summing this with the third amplifier's current limits, it will be seen that the third amplifier can operate normally and provide the load with from 8 ma. sink current to 20 ma. source current. The middle amplifier, then, will not saturate and the selected signal will be processed with the same gain and dynamic relationship as if it had been processed by a single nonredundant channel.

Figure 2:
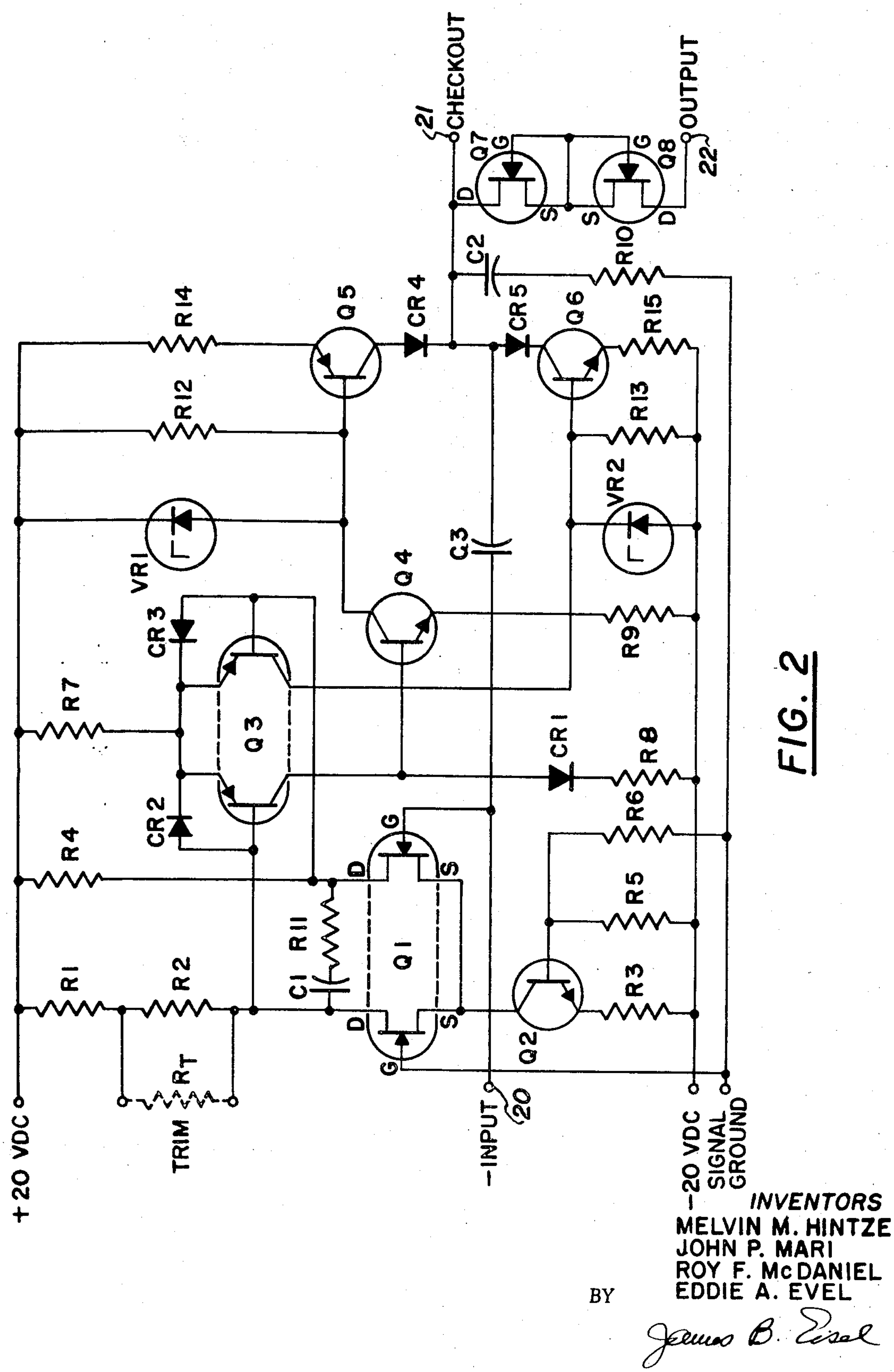
FIG. 2 is a schematic diagram of an amplifier suitable for use in the majority voting circuit shown in block form in FIG. 1.

FIG. 2 shows an amplifier to be used in the circuit of FIG. 1. It is felt that a detailed description of the amplifier circuitry, much of which is conventional, is not necessary and would be unduly lengthy; rather, a brief description of circuit operation is given with those features of novelty being emphasized. The transistorized amplifier is supplied with power at +20 v. DC and −20 v. DC. The input signal is fed into input terminal 20 and is amplified in dual FET transistor Q1, dual transistor Q3, inverter transistor Q4 and output transistors Q5 and Q6. Transistor Q2 and its associated circuitry provide common mode rejection. Diodes CR2 and CR3 provide base-to-emitter breakdown voltage protection for transistor Q3. Zener diodes VR1 and VR2 and resistors R12, R13, R14 and R15 set the limits of the saturation current; VR1, R12 and R14 set the positive saturation current at 16 ma. and VR2, R13 and R15 set the negative saturation current at 12 ma. This current limiting feature will take care of any failure upstream from the majority voting circuit; that is, it will provide current limiting if the amplifier itself is failure-free and is saturated in either direction.

In addition to having the majority voting system take care of any failures upstream, it is desirable also to provide for continued system operation in case there should be a failure in one of the majority voting system amplifiers. Such failures are provided for as follows. If one of the power supplies should fail to ground, such as from a lead shorting, diodes CR4 and CR5 in the collector circuits of output transistors Q5 and Q6 nullify the effect on the output circuit and maintain a high impedance. In the event of a short circuit from a power supply to one of the leads, or to any part of the circuit as far downstream as checkout point 21, the back-to-back configuration of the dual FET's Q7 and Q8 will act as a high resistance current limiter. This FET combination is per se well known as a current limiting device; it does not insert a large resistance during normal circuit operation, and thus avoids the voltage dividing disadvantage of a series resistor, which would limit the power delivered to the load, but an attempt to pass excessive current through it causes it to assume its high resistance characteristic.

A third type of failure would be a complete power failure, or an open line that would disconnect the amplifier from the output 22. In such a case, with two of the amplifiers remaining operative, the amplifier having the lower of the two outputs will saturate in the negative polarity, with a sink current of 12 ma. The amplifier having the higher of the two outputs will operate in the unsaturated mode, driving the load normally. Since its current capacity ranges from +16 ma. to −12 ma., it will be seen that it can supply the 12 ma. sink current of the saturated amplifier and have a current range of from +4 ma. to −12 ma. to drive the load. If both the source and sink currents of the amplifiers were equal, then there would be an ambiguous situation without one amplifier clearly being dominant, and a noisy condition could result. This is the reason the amplifiers are designed to have a substantial difference between the values of their positive and negative saturation currents.

Checkout point 21 is a convenient access terminal that may be used to ascertain operability of the individual amplifier and of the system as a whole.

The components actually used to construct the amplifier shown in FIG. 2 are given in the following table:

| Component designation: | Description |
|---|---|
| Q1 | 2N3921. |
| Q2, Q4, Q6 | 2N3700. |
| Q3 | 2N3811. |
| Q5 | 2N2907A. |
| Q7, Q8 | FN710A. |
| CR1, 2, 3, 4, 5 | Hughes HDS 11. |
| VR1 | 1N3518, 10 v. |
| VR2 | 1N3515, 7.5 v. |
| C1 | 0.02 μf. |
| C2 | 2.0 μf. |
| C3 | 100 μμf. |
| R1 | 6190 ohms. |
| R2 | 1210 ohms. |
| R3, R5 | 3010 ohms. |
| R4 | 6810 ohms. |
| R6 | 9530 ohms. |
| R7 | 1300 ohms. |
| R8, R9 | 1620 ohms. |
| R10 | 51.1 ohms. |
| R11 | 40.2 ohms. |
| R12, R13 | 2800 ohms. |
| R14, R15 | 562 ohms. |

The amplifier shown in FIG. 2 built with the components as listed above is suitable for operation with a load resistance $R_L$ of from about 5,000 ohms up to infinity.

What is claimed is:

1. An analog majority voter for receiving three analog input signals and driving a load circuit comprising:

(a) three substantially identical amplifiers, each having an input and an output, each having a nominal open loop gain of at least five thousand, each acting as a substantially constant current source when driven into saturation, and each providing a source current when driven into saturation in one polarity that is substantially different in absolute value than the sink current it provides when driven into saturation in the other polarity;

(b) means for connecting an input signal to each corresponding amplifier input;

(c) means connecting said amplifier outputs together and to the load circuit; and (d) three substantially identical negative feedback circuits each connecting a common point in the load circuit to the input of its corresponding amplifier.

References Cited

UNITED STATES PATENTS

| | | | |
|---|---|---|---|
| 3,492,588 | 1/1970 | Woodward, Jr. | 307—235 X |
| 3,350,573 | 10/1967 | Barany | 307—255 X |
| 3,551,824 | 12/1970 | Rotier | 328—147 |
| 3,489,889 | 1/1970 | Escobosa | 244—77 M X |
| 3,420,993 | 1/1967 | Chamberlain | 328—147 X |
| 3,243,585 | 3/1966 | Escobosa | 328—104 X |
| 3,527,961 | 9/1970 | Palini | 307—235 |
| 3,553,492 | 1/1971 | Bugay | 307—235 |

FOREIGN PATENTS

| | | | |
|---|---|---|---|
| 1,114,100 | 5/1968 | Great Britain | 307—235 |

OTHER REFERENCES

Lancaster, "Using the New Constant — Current Diodes," pp. 30–31 and 78, Electronic World (periodical), October 1967.

HERMAN KARL SAALBACH, Primary Examiner

L. N. ANAGNOS, Assistant Examiner

U.S. Cl. X.R.

307—219, 237; 328—154